United States Patent [19]

Segarra

[11] Patent Number: 4,551,842
[45] Date of Patent: Nov. 5, 1985

[54] ERROR-PROTECTED DATA TRANSMISSION DEVICE AND COMMUNICATION NETWORK

[75] Inventor: Gérard Segarra, Jossigny, France

[73] Assignee: U.S. Philips Corporation, New York, N.Y.

[21] Appl. No.: 455,369

[22] Filed: Jan. 3, 1983

[30] Foreign Application Priority Data

Jan. 11, 1982 [FR] France ............................... 82 00285

[51] Int. Cl.⁴ .......................... H04L 1/00; H04B 3/04
[52] U.S. Cl. ....................................... 371/69; 371/30; 371/36
[58] Field of Search .................... 371/69, 36, 48, 67, 371/30

[56] References Cited

U.S. PATENT DOCUMENTS

| 3,760,371 | 9/1973 | Pitroda et al. | 371/69 X |
| 3,781,794 | 12/1973 | Morris | 371/69 |
| 3,973,242 | 8/1976 | Field et al. | 371/69 |
| 4,128,809 | 12/1978 | Kaye | 371/69 X |

Primary Examiner—Jerry Smith
Assistant Examiner—Mark Ungerman
Attorney, Agent, or Firm—Jack E. Haken; James J. Cannon, Jr.

[57] ABSTRACT

In a data transmission device having at least one transmitting station and at least one receiving station the same message is transmitted with an integer number of copies. This number may vary from one message to another. The number is predetermined by the transmitting station as a function of the reliability of the network and the functional importance of the message; thus, the same sequencing of the general events is presented to all stations without any acknowledge process being required.

10 Claims, 5 Drawing Figures

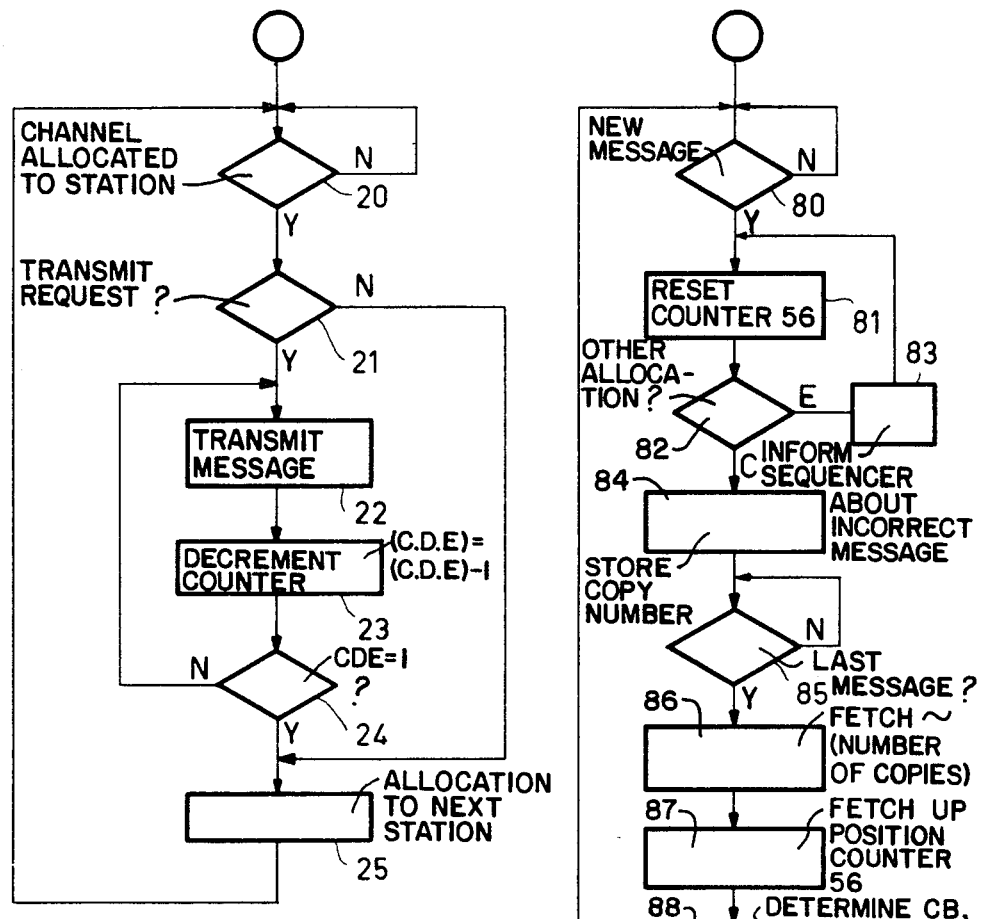
FIG.2
FIG.5
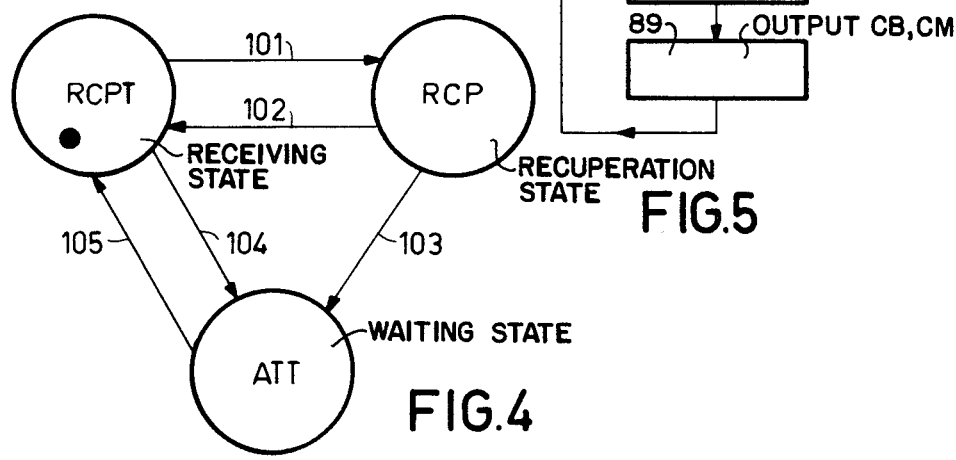
FIG.4

ERROR-PROTECTED DATA TRANSMISSION DEVICE AND COMMUNICATION NETWORK

BACKGROUND OF THE INVENTION

The invention relates to a data communication network having at least one transmitting station and one receiving station. The transmitting station has:

a control device for controlling the transmission of messages on the network;

a counter for indicating the integer number of copies of the same message to be transmitted, said counter having an output connected to said control device;

storage circuits for temporary storage of a message generated by the transmitting station, said storage circuits being connected to said control device;

an encoder connected with said storage circuits for providing an error recognition code to each generated message;

said control device being further provided for transmitting consecutively each generated message together with its provided error recognition code as many times as indicated by said integer number.

The receiving station has:

a decoder connected to said network for decoding received messages on the basis of their added error recognition code and for generating an acceptance signal if a received message has been correctly decoded;

receiving circuits having a control input connected to said decoder for receiving said acceptance signal and a data input connected to said network for receiving messages transmitted thereon, said receiving circuits comprise recognition means for recognizing among said received messages and copies of a same message, said receiving circuits further comprising first fetching means for fetching among said recognized copies under control of said acceptance signal only a single copy for which said acceptance signal has been generated.

DESCRIPTION OF THE PRIOR ART

Such a data communication network is disclosed in DE-AS No. 1,293,817, dated Nov. 10, 1967. Said transmitting station comprises storage means and a counter. This counter indicates a value "k" which corresponds to the number of copies of the same message to be consecutively transmitted. The message to be transmitted is stored in the storage means. The transmission of the k copies of the same message is performed by reading the content of the storage means k times and by decrementing the content of the counter by one unit in response to each read operation. When k copies of the same message have been transmitted, another message is loaded into the storage means and the counter is reinitialized to this same value k. According to said German Patent Application this value k must be at least equal to two. The transmitted messages are encoded by means of an encoder which forms part of the transmitting station. The receiving station comprises a decoder which is capable of detecting an error in an encoded message transmitted by the transmitting station. The receiving means comprises fetching means which comprises a register and a connection circuit. The connection circuit comprises a first input which is connected to the output of the register and a control input which is connected to an output of the decoder. When the decoder has determined that the message received is correct, it applies an acceptance signal to said control input of the connection circuit. Under the control of the acceptance signal supplied by the decoder, the connection circuit connects the output of the register in which the received message is stored to an input of a memory of the receiving station, thus validating the message received. However, if the decoder has detected an incorrect message, it does not generate the acceptance signal which is thus not applied to the second input of the connection circuit. The different copies of the same messages are recognized by the recognition means and as soon as a message has been stored in the memory of the receiving station, the subsequent received copies are neglected.

The drawback of such a data transmitting station is that the number of the transmitted copies of the same message cannot be varied. Regardless of the functional importance or the length of the message, the transmitting station always dispatches the same number of copies. This may cause overloading of the data communication network so that the efficiency of the network is reduced.

SUMMARY OF THE INVENTION

It is an object of the invention to provide a data communication network in which the number of copies of the same message to be transmitted by the transmitting station may vary from one message to the another.

A data transmission device in accordance with the invention is characterized in that said control device of said transmission station is provided for generating an adjustment signal for each message generated by said transmitting station, said counter being an adjustable counter having a limited number of positions, said adjustable counter comprises a first counter input connected to said control device for receiving said adjustment signal, said adjustable counter being settable to one of said positions under control of said adjustment signal, which set position indicates the integer number of copies of the same message to be transmitted.

Thanks to the use of an adjustable counter in the transmitting station, the number of copies of the same message to be transmitted may vary from one message to another. The value to which the counter is set for each message to be transmitted is determined by the transmitting station which generates a relevant adjustment signal for each message generated message to be transmitted.

The object of the consecutive transmission of copies of the same message is to increase the probability of correct routing of a message to such an extent that the risk of errors may be considered to be zero; error protection devices thus become superfluous and may be simply omitted.

The advantage of the invention will be illustrated on the basis of a numerical example: for a network of conventional quality the error rate is in the order of $10^{-8}$ per bit, which means that 1 out of $10^8$ bits transmitted will be incorrect upon reception; for a message containing $10^3$ bits, or 125 octades, the error rate will be $10^{-8} \times 10^3 = 10^{-5}$; when this message is transmitted three times, the risk of any of the three copies not being correctly received will then be $10^{-5} \times 10^{-5} \times 10^{-5} = 10^{-15}$; assuming a network operating at 10M bits/second, that is to say $10^7$ bits/second, some $10^8$ seconds will be required for an error to occur ($10^8 \text{s} \times 10^7 \text{ bits/s} \times 10^{15} = 1$) or $10^8$ seconds $= 1,150$ days =3.15 days; for 4 copies at 100M bits/second one would find 31,500 years.

The desired reliability may vary from one message to another, depending on whether a command message, a synchronization message, a data message etc. is concerned. The determination of the number of copies of the same message to be transmitted, therefore, is a task of the transmitting station which takes into account various parameters for this purpose.

A data communication network in accordance with the invention is notably characterized in that the transmitting station further comprises a weighting element which comprises an output connected to said counter input and an input for receiving said generated messages, said weighting element comprising first means for subdividing on predetermined criteria said generated messages into at least two types of messages and for associating a dedicated adjustment signal with each type of message.

Thanks to the use of a weighting element the transmitting station can take into account various parameters and can subdivide on predetermined criteria the messages into at least two types. With each type of message there is associated a dedicated adjustment signal which value indicates the number of copies to be transmitted.

A preferred embodiment of a data communication network in accordance with the invention is characterized in that said subdivision into at least two types of messages to be transmitted is based on the functional importance of the message.

Thanks to the subdivision of the messages in accordance with their functional importance, it is achieved that the very important messages, for example, process control messages, are transmitted with a larger number of copies than the messages of less functional importance. The risk that the very important message do not arrive at the destination is thus substantially zero. The functional importance of the message can for example be established on the base of the opcode of an instruction included in the message.

Another preferred embodiment of a data communication network in accordance with the invention in which each message to be transmitted comprises a number of bits is characterized in that said subdivision into at least two types of messages to be transmitted is based on the length according to the number of bits of the message. The probability of an error occurring in a long message is higher than in a short message. By taking into account the length of the message, the number of copies to be transmitted can be varied as a function of this length, so that the probability of errors in the transmission of messages is reduced.

A preferred embodiment of a data communication network in accordance with the invention is characterized in that said adjustable counter being provided for producing a series of indications which comprises at least a first and a second mutually exclusive indication, said transmitting station further comprises adding means for adding under control of control unit and said adjustable counter said first indication to the first copy and said second indication to the last copy of said integer number of copies of the same message. The assignment of a specific indication to the first and the last copy of said number allows for the receiving station to recognize whether the first or the last copy is concerned.

Preferably, a data communication network in accordance with the invention is characterized in that said series of indications being produced under control of said adjustment signal and comprises a number of elements formed by subsequent copy numbers, which number equals said integer number, said adding means further being provided for adding a respective copy number to each copy of said integer number of copies; said receiving means comprises second fetching means for fetching said copy number from a received message and for presenting said fetched copy number to said recognition means, said recognition means taking into account said copy number for the realization of said recognition.

Thus, each copy of the message can be enumerated with its own copy number. This also enables the receiving station to know and take into account how many copies of the message have been transmitted.

Preferably, a data communication network in accordance with the invention is characterized in that said adding means being provided for adding said respective copy numbers in a decreasing order, the last copy of said integer number of copies bearing the lowest number; said recognition means being provided for detecting said lowest number.

Thus, the implementation of the receiving station is comparatively simple.

The invention preferably relates to a data communication network comprising at least two transmitting-/receiving stations, each of which comprises a transmission unit and a receiving unit, said receiving unit comprises a network-quality counting element for determining a quality value which indicates the number of correct and/or incorrect copies of the same message received, an input of said counting element being connected to an output of said decoder. Thanks to the fact that the station can transmit as well as receive, each station can count, by way of its network-quality counting element, the number of correct and/or incorrect copies, determined as a function of the decoding, among the copies of the same message received.

A data communication network in accordance with the invention is notably characterized in that each transmitting unit comprises a weighting element having an output which is connected to an input of said adjustable counter and an input which is connected to an output of said network-quality counting element for the reception of said quality value, said weighting element being provided for determining, on the basis of the said quality value, a network error rate for each message to be transmitted, and for deducting therefrom said adjustment signal. The number of correct/incorrect copies of the same message allows for a value representing the quality of the network to be deducted therefrom. This network-quality may vary as a function of time and location. The weighting element can thus taken into account this variable network-quality value in order to determine an error rate and vary the number of copies to be transmitted as a function of this variable error rate.

A preferred embodiment of a data communication network in accordance with the invention is characterized in that said integer number of copies is smaller than or equal to ten. Overloading of the network is thus avoided.

BRIEF DESCRIPTION OF THE DRAWINGS

The invention will be described in detail hereinafter with reference to the following figures.

FIG. 2 illustrates the transmission of a number of copies of the same message;

FIG. 4 illustrates the reception of the copies of the same message; and

FIG. 5 illustrates the determination of the network error rate.

DESCRIPTION OF THE PREFERRED EMBODIMENTS

The invention will be described with reference to an embodiment where the data transmission station forms part of a data communication network having a plurality of transmitting/receiving stations. Each of the stations is connected to a channel for the transport of data, notably data in the form of messages. The channel for the data transport is formed by a network of coaxial cables or optical fibres or another data transport means utilizing carrier waves, for example, radio waves.

The description of the figures will be preceded by an examination of the structure of the frame of a conventional type of message. The message comprises various fields, such as

| PRE | DA | SA | CDE | INFO | FCS | the part PRE is the preamble which generally includes one or more synchronization bits and other bits which are used for the physical verification of the quality of the message, for example, the automatic check of the gain required as a function of the electric power of the message received.

the part DA contains the destination address of the message, at least one bit thereof indicating whether this message is in the addressed mode (a single destination station) or in the multicast mode (several destination stations); the other bits are either the number of a station in the addressed mode or, in the multicast mode, the number of a function which is known to each station connected to this function.

the part SA contains the address of the station transmitting the message.

the part CDE, the part most specifically relating to the invention, contains the copy number of a duplicated message.

The same message transmitted several times in succession thus includes its own copy number; these numbers may have, for example, a decreasing order in time: n−1, n−2, ... 1, 0 when "n" message copies are despatched. The part CDE may also contain a first indication added only to the first copy and a second indication added only to the last copy. The part CDE may also contain the total number of copies of the same message and the copy number, for example, when the copies are enumerated in an increasing order.

the part INFO contains the actual message: commands, tests, data, etc.

the part FCS contains the test bits which enable verification of the physical transmission by a known process, for example, by division of the frame by a generator polynomial; on this subject see, for example, the *ORANGE BOOK,* Volume VIII.2, CCITT, published by the International Telecommunication Union, Geneva, 1977 notably paragraph 2.2.7.

Figure 1:
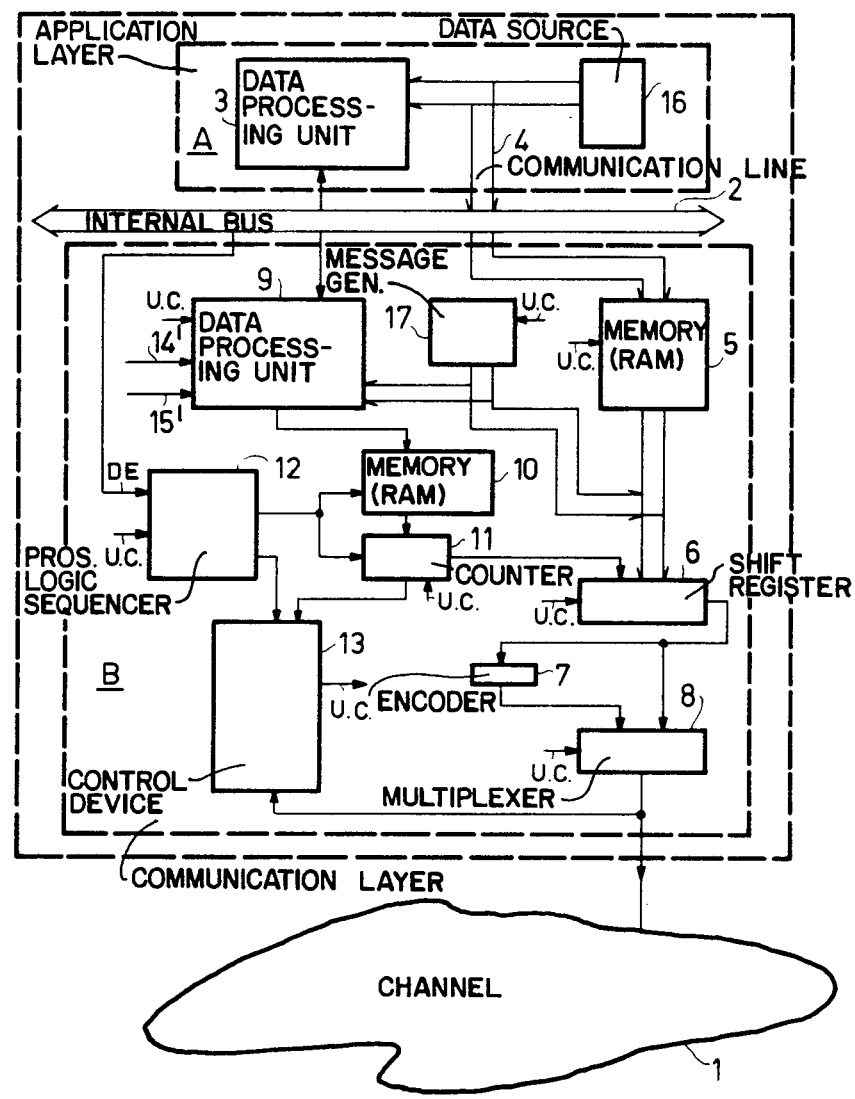
FIG. 1 shows an embodiment of a transmitting station in accordance with the invention.

FIG. 1 shows an embodiment of an automatic transmission unit of a transmitting station in accordance with the invention. The automatic transmission unit communicates, via a multiplexer 8, with the channel 1 on which the data are transported. The automatic transmission device comprises a layer structure; on this subject, see, for example, copending U.S. Pat. No. 4,466,063. For the description of the invention, the following layers among the various layers of the station are considered: the application layer A, also referred to as upper layer, and the communication layer B. The exchange of information between the application layer and the communication layer takes place by way of an internal bus 2. FIG. 1 only shows those elements of a transmitting station which are necessary for a proper understanding of the invention. The application layer comprises inter alia a data source 16 and a data processing unit 3, for example, a microprocessor. The data source and the data processing unit are interconnected by way of a communication line 4, for example, a bus. The communication line 4 is also connected to the internal bus 2. Via the communication line 4 and the internal bus, the data source 16 loads the fields SA, DA, INFO of a message to be transmitted into a read/write memory 5. This memory 5 forms part of the communication layer B. As its name indicates, this communication layer serves to organize the communication between the transmitting station and the network.

A data output of the memory 5 is connected to a first input of a shift register 6 with parallel/series converter, a second input of which is connected to an output of an adjustable counter 11. An output of the shift register 6 is connected to a first input of a multiplexer 8 as well as to an input of an encoder 7, an output of which is connected to a second input of the multiplexer 8. The multiplexer 8 forms the frame with its various fields, the test field FCS thereof being elaborated by the encoder 7. The communication layer also comprises a data processing unit 9, for example, a microprocessor, an output of which is connected to an address input of a memory 10, for example a read-only memory (ROM) or a programmable read-only memory (PROM). The communication layer also comprises a management message generator 17. A data output of this memory 10 is connected to a first input of the counter 11. The operation of the processing units 9 and 5 and of the memory 10, the counter 11 and the management message generator 17 will be described hereinafter.

The communication layer also comprises a programmable logic sequencer 12 with an input which is connected to the internal bus 2 for the transmission of a transmission request signal DE. The communication layer also comprises a microprogrammed automatic control device 13, which may be the same element as the data processing unit 9.

The microprogrammed automatic control device 13 receives information from the programmable logic sequencer 12, the counter 11 and the channel 1 in which specific messages signal the instant at which the channel is allocated to the station for transmission.

The microprogrammed automatic control device 13 despatches microcommands U.C. to different components of the system which are indicated in the figures by arrows U.C.

The components used may be, for example:

the adjustable counter 11: 74 LS 193, make Signetics the adjustable memory 5: μPD 2167, make NEC
the register 6: 74 LS 165, make Signetics
the encoder 7: 8 X 01, make Signetics
the multiplexer 8: 74 LS 157, make Signetics
the programmable logic sequencer 12: 82 S 100, make Signetics
the units 13, 9 and 5: 82 S 100, 82 S 137 and 74 LS 374, make Signetics
the memory 10: 2716, make Intel.

The automatic transmission unit of a transmitting station serves for the consecutive transmission of as many copies of the same message as indicated by the counter 11 and for the enumeration of these copies in a decreasing order. The method of determining the number of copies to be transmitted for each message, that is to say the adjustment of the adjustable counter 11, will be described later, because it necessitates an understanding of how the message is received by a receiving station.

FIG. 2 illustrates, by way of a diagram, the operation of the automatic transmission device shown in FIG. 1 for the transmission of an integer number (n, n≧1) of copies of the same message.

The test (20) answers the question: is the channel allocated to the station? The automatic control device of the station awaits the allocation. Such allocation may take place in different ways as a function of the type of network. The article by Michel Martin, published in *ZERO-UN informatique*, No. 146, December 1980–January 1981, pages 78 through 82, gives a survey of these different ways. Evidently, the allocation of the channel is of importance only in networks where the access to the channel is based on a "right to transmit". In a network where other access rules are applicable, for example, the Ethernet network, (see for example 01 Hebdo, No. 631, February 1981, page 10) this question (20) is not posed or is posed in a different form. It will be evident that the invention is not restricted to the network in which access to the channel is based on a "right to transmit" and that FIG. 2 shows merely a preferred form of the operation of the automatic transmission device. When the answer is YES, the test (21) answers the question: is there a transmission request from the upper layer? (signal DE applied to the programmable logic sequencer?). If the answer is NO, the allocation is abandoned (25) to the benefit of another station. If the answer is YES, the station executes the transmission of the requested "n" messages; the multiplexer 8 then assembles the various fields of the message as described; the first message is transmitted with the field CDE having its initial value, that is to say the value whereto the counter 11 has been adjusted: EM-CDE (22); the counter 11 is then decremented by 1 (23):(CDE)=(CDE)−1; said counter is then tested (24) for the value (CDE)=−1?); if the answer is NO, the message is transmitted again with the new value of the counter; the answer YES means that the last message transmitted contained a field CDE equal to 0, so it concerns the last one of the n copies of the message to be transmitted and the allocation of the channel is abandoned (25).

It will be clear that the automatic transmission device is specially conceived for the consecutive transmission of "n" copies of a message, each copy comprising its own copy number and being enumerated from n−1 to 0 in a decreasing order.

Within the scope of the invention it is equally well possible to enumerate the copies in an increasing order and to indicate the total number of copies. The last copy then bears a number which is equal to the total number indicated and can thus be recognized as being the last copy of the n copies of the transmitted message. It is also possible to despatch several messages, each message having its own number of copies, before the allocation of the channel is abandoned, but the operating principle of the network must again be compatible with this possibility.

Figure 3:
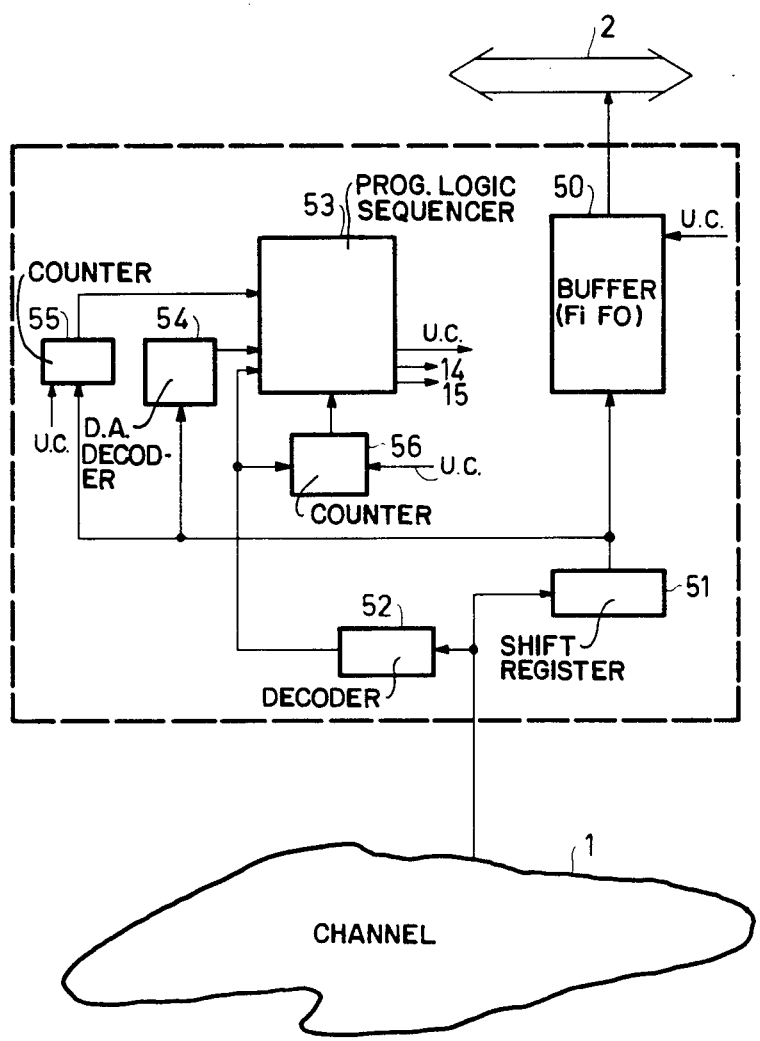
FIG. 3 shows an embodiment of a receiving station in accordance with the invention.

The automatic receiving device (communication layer) of a receiving station in accordance with the invention is shown in FIG. 3. The automatic receiving unit of FIG. 3 and the automatic transmission unit shown in FIG. 1 generally form part of the same station connected to the communication network. Consequently, the two units in the embodiment chosen may have given elements in common. The messages transported on the channel 1 arrive in the input waiting buffer of a register of the type FIFO (first in first out) 50 via a shift register 51 with series/parallel converter. The part FCS of each copy of a message is fetched and tested by the decoder 52. The decoder 52 verifies if the copy of a message received conforms to a given standard. One embodiment of a decoder 52, for example, utilizes the encoder 7 (automatic transmission device in FIG. 1) and the elaboration of the content of the test field FCS of the copy of the message received and compares the content of the field FCS with said part FCS fetched from the copy received. If the result of this comparison is positive (fields FCS the same), the copy has been correctly received (correct message) and the decoder generates an acceptance signal. If the result of this comparison is negative (fields FCS unequal) an incorrect copy is concerned (incorrect message) and in this case the decoder does not generate an acceptance signal. The acceptance signal is applied to a programmable logic sequencer 53 (as the case may be, this sequencer may be the same as the sequencer 12 of FIG. 1). The sequencer 53 also receives the signals which arrive first of all from a decoder 54 for the destination address field DA; enabling inter alia determination of whether the station is the destination of the message received and whether a change of allocation has taken place, and secondly from recognition means which comprises a counter 55 which supplies a signal which indicates its passage through the value 0; the sequencer takes into account these different data and generates microcommands (U.C.) which cause the station to enter the various states shown in FIG. 4. The components used for the automatic receiving device of the receiving station may be, for example:
the register FIFO: Z8060, make Zilog
the programmable logic sequencer 53: 82S100, make Signetics
the register 51: 74LS164, make Signetics
the decoder 52: 8X01, make Signetics
the address decoder 54: 82S100, make Signetics
the counter 55: 74LS193, make Signetics.

FIG. 4 illustrates the operation of the automatic receiving device. The initial stable state is the receiving state RCPT; when a correct message is received it is validated for the upper layer if the station is the destination (DA adequate). The message is then fetched from the FIFO register 50 and is applied to the upper layer via the internal bus 2. If said correct message bears a copy number equal to zero, there is no copy of said message and the automatic receiving device remains in the state RCPT for the next message. However, if the copy number differs from zero, the copies which are to follow are of no interest for the station, the counter 55 is loaded with this copy number and the automatic receiving device assumes (104) the waiting state ATT. In this state, the sequencer 53 decrements the counter by 1 in reaction to each copy received, be it correct or incorrect; thus, the station awaits the ends of the copies in order to return to the state RCPT; this return (105) takes place when a correct message bearing the number 0 (the last message) is detected, or when the counter 55 reaches its zero position during the counting down of the copies as from the number of the copy correctly received, or when the decoder 54 has detected a change of allocation. These different conditions for the step (105) may be redundant; this introduces a given safety level should one of the copies be incorrectly received. It appears that it suffices to receive a single correct copy for the message to be validated by the upper layer.

Returning to the initial state RCPT, it is assumed that an incorrect message is received; the automatic device then proceeds (101) to the recuperation state RCP in the hope that this message will be followed by copies of which at least one will be correctly received. When the device detects a correct message having a copy number other than zero, the message is validated and, as previously, the copy number is loaded into the counter 55 and a change-over is made (103) to the waiting state (ATT) in order to ignore the subsequent copies. When the automatic device receives a correct message bearing the number zero in the recuperation state, it returns (102) to the receiving state; if the device receives an incorrect message in the recuperation state, it remains in this state. Finally, if the device detects a change of allocation in the recuperation state, it returns (102) to the receiving state knowing that a message has been lost. The latter event may sometimes be without great importance. This is the case, for example, when a message is concerned which is not intended for the station but which has been considered by this station due to an incorrect address. When a message is concerned which is intended for the relevant station, it may be a non-duplicated message, that is to say a non-primodial message, or a message transmitted in the multicast mode, so that there is a good chance that the message has been correctly received by another station. In given cases it will concern a duplicated message with a known error rate which is determined by the station transmitting the message, that is to say with a known and accepted risk.

The determination of the error rate by the transmitting station for the transmission of a message will now be described with reference to the FIGS. 1 and 3. It is on the basis of this error rate that the transmitting station determines the number of copies of the same message to be transmitted and adjusts the counter to this number.

The determination of the error rate and hence the number of copies to be transmitted is performed as a function of various parameters, that is to say
(a) the reliability of the network
(b) the functional importance of the message
(c) the length of the message.

Evidently, these various parameters may vary from one message to another, so that it is important to determine this error rate for each message to be transmitted.

The determination of the error rate as a function of these various parameters will be described hereinafter.
(a) The reliability of the network.

Each network has a specific error rate which is determined by the physical quality of the network. For example, when various stations are interconnected by means of a coaxial cable, it is the physical quality of the cable which determines the error rate. The network error rate (NER) may be expressed as follows:

$$BLER \text{ (block error rate)} = \frac{\text{number of messages lost}}{\text{number of messages transmitted}}$$

$$BER \text{ (bit error)} = \frac{\text{number of bits lost}}{\text{number of bits transmitted}}$$

A customarily accepted value for NER is $10^{-8}$. The network error rate may locally be smaller than this value, for example, due to local disturbances caused by the presence of parasitic sources (for example, a temporarily switched on motor). Therefore, it is very important to determine the network error rate for each message to be transmitted in order to take into account the effects of such local disturbances. In order to achieve this, the invention utilizes the fact that the communication layer of each station considers all messages transported on the channel, regardless of the fact whether this station is the destination or not. As has already been described with reference to the FIGS. 3 and 4, the decoder 52 verifies, on the basis of the field FCS, if the copy of the message received conforms, and the counter 55 is loaded with the number of the copy received. This copy number will also be taken into account by the programmable logic sequencer 53. The automatic receiving device illustrated in FIG. 3 also comprises a further counter, notably the counter 56, an input of which is connected to an output of the decoder 52. The counter 56 counts the number of copies of a message which have been decoded as being correct.

The diagram of FIG. 5 illustrates a preferred method of determining the network error rate by means of the programmable logic sequencer 53 of the receiving station. In this example it is assumed that each station which acts as network quality counting element which is allocated, for example, by a token which circulates on the channel, transmits a message, even in the case when it has no message to transmit; in that case it transmits a message indicating that it has nothing to transmit. The test 80 answers the question: is there an indication in the information which circulates on the channel and which is interpreted by the receiving station as that this information concerns a new message which comprises one or several copies? This indication is given, for example, by a token which circulates on the channel and which allocates the right to transmit to different stations. If the answer to the question of the test 80 is NO (N), the programmable logic sequencer awaits for this event. However, if the answer is YES, the counter 56 is reset to zero (81). The test 82 verifies if a copy number is loaded into the counter 55 and the sequencer 53. The test 82 also verifies if meanwhile no allocation has taken place to another station of the network; if this is the case and the counter 55 has not been adjusted it means that there has not been a correct message between these two allocations (E). The latter information is thus supplies (83) to the output 15 of the sequencer 53. This information is expressed, for example, as follows:

$$CB = \frac{\text{number of correct copies received}}{\text{number of copies received}} \quad \text{(output on output 14)}$$

-continued
$$CM = \frac{\text{number of incorrect copies received}}{\text{number of copies received}} \text{ (output on output 15)}$$

When all copies are incorrect, CM is adjusted to be equal to 1 (CM=1) and CB=0.

However, if (C) the copy number n has been loaded into the counter 55 and the sequencer 53, the latter stores (84) this copy number, for example, in an internal register. As in the preferred embodiment of the invention, the messages are enumerated in the decreasing order; this number thus indicates the number of copies of the same message transmitted. The test 85 verifies if the counter 55 has reached zero (last message detected) and also if meanwhile there has not been an allocation to another station of the network. If this is not the case (N), the sequencer 53 awaits one of said events. However, if the counter 55 has reached zero (Y) or if an allocation to another station has taken place, the content of the internal register in which said number n has been stored (step 84) is fetched (86). Subsequently (87), the position of the counter 56 is fetched up. The counter 56 indicates the number of correct message copies received. On the basis of the value of n and the value indicated by the counter 56, the sequencer 53 thus determines (88) the values CB and CM. The values CB and CM are then presented (89) to the outputs 14 and 15, respectively, of the sequencer 53. This procedure is subsequently repeated as from the test 80.

The outputs 14 and 15 of the sequencer 53 are connected to the inputs 14' and 15' respectively, of the data processing unit 9 of the communication layer of the transmitting station (FIG. 1). The data processing unit 9 takes into account the values CB and CM in order to determine the instantaneous network error rate. The data processing unit 9 also takes into account other parameters for determining the network error rate. These other parameters will be described hereinafter. On the basis of the error rate thus determined, the data processing unit generates an address for addressing the memory 10 which is used as a weighting element. At each address of this memory 10 there is stored a value which indicates the number n of copies to be transmitted of the same message. This memory has a limited storage capacity actually, said number n preferably is smaller than or equal to ten ($1 \leq n \leq 10$), because it makes no sense to transmit more than ten copies of the same message as otherwise the network would be overloaded so that it would become inefficient. Actually, the transmission of more than ten copies of the same message already indicates that the network must be substantially disturbed and then the transmission of more than ten copies would not make sense anyway.

For each message generated by the transmitting station the adjustable counter 11 is thus adjusted to the value addressed in the memory 10. This adjustment is performed under the control of the sequencer 12 and the microprogrammed control device 13 which generates and adjustment signal for loading said value into the adjustable counter 11.

(b) The functional importance of the message.

Two types of message are distinguished herein:

(1) messages which concern the management of the network. These messages are usually generated by the communication layer. They concern, for example, synchronization messages or control messages.

(2) messages containing information originating from the application layer.

The transmitting station supplies an acceptable error rate (TEA) for each message to be transmitted. TEA may be expressed as follows:

$$TEAM = \frac{\text{number of messages lost}}{\text{number of messages transmitted}}$$

or $$TEAB = \frac{\text{number of bits lost}}{\text{number of bits transmitted}}$$

The value of TEA will be expressed in TEAM or TEAB as a function of what is covered by the test field FCS. The value of the acceptable error rate will be determined in accordance with the type of message.

(1) For messages concerning the management of the network, TEA will be determined by the data processing unit 9 of the communication layer. For this purpose the data processing unit 9 comprises a data input which is connected to a data output of a management message generator 17 of the communication layer. The content of these management messages is analyzed by the data processing unit 9 which deducts a value TEA therefrom. This value TEA is in its turn weighted by the values CB, CM mentioned above. The analysis of these management messages is performed, for example, in accordance with predetermined criteria, for example, $TEAM = 10^{-4}$ for a synchronization message. The error rate is thus determined on the basis of the values TEA, CB, CM.

(2) For messages originating from the application layer, TEA will be determined by the data processing unit 5 of this application layer. The content of these messages is analyzed by the data processing unit 5. For example, when a process control message is concerned for which it is very important that it is transmitted at a well determined instant, the data processing unit will determine a value $TEA = 10^{-6}$. However, when an office information message is concerned which is not very important, TEA will be $10^{-3}$.

In order to verify whether the value TEA determined by the data processing unit 5 is compatible with the error rate of the network, the value TEA is presented to an input of the data processing unit 9. If the value TEA is compatible with the network error rate, the data processing unit will determine an address in the memory 10 on the basis of this value TEA, and the values CB, CM. However, if the value TEA is not compatible with the network error rate, the data processing unit will warn the application layer and, as the case may be, it can reduce this value to the maximum network error rate ($10^{-8}$).

(c) The length of the message.

The error rate will also vary as a function of the length of the message. The risk of a long message being incorrect is higher than in the case of a short message. Evidently, the more bits are included in a message, the higher the risk of at least one bit being incorrect will be. A transmitting station in accordance with the invention takes into account the length of the message for the determination of the error rate and hence for the number of copies to be transmitted of the same message. Using predetermined criteria, the data processing unit 5 of the application layer will determine the TEA as a function of the length of the message. Optionally, the data processing unit 9 of the communication layer may also take into account the length of the management messages for the determination of the TEA. However, because these management messages are generally short messages, this may prove to be a redundant operation.

In an initialization phase, that is to say during a branch operation or the starting up of a station of the network, the transmitting station may arbitrarily determine an error rate for the transmission of the first message. For example, the error rate may then be made equal to the maximum network error rate $NER = 10^{-8}$.

What is claimed is:

1. A data communication network comprising at least one transmitting station and one receiving station, said transmitting station comprising:
    a control device for controlling the transmission of messages on the network, said control device being provided for generating an adjustment signal for each message generated by said transmitting station;
    an adjustable counter having a limited number of positions, said adjustable counter comprises a first counter input connected to said control device for receiving said adjustment signal, said adjustable counter being set to one of said positions under control of said adjustment signal, which set position indicates the integer number of copies of the same message to be transmitted, said adjustable counter having an output connected to said control device;
    storage means for temporary storage of a message generated by the transmitting station, said storage means being connected to said control device;
    an encoder connected with said storage means for providing an error recognition code to each generated message;
    said control device being further provided for transmitting consecutively each generated message together with its error recognition code as many times as indicated by said set position;
    said receiving station comprising:
    a decoder connected to said network for decoding received messages on the basis of their added error recognition code and for generating an acceptance signal if a received message has been correctly decoded;
    receiving means having a control input connected to said decoder for receiving said acceptance signal and a data input connected to said network for receiving messages transmitted thereon, said receiving means comprising recognition means for recognizing among said received messages said copies of a same message, said receiving means further comprising first fetching means for fetching among said recognition copies under control of said acceptance signal only a single copy for which said acceptance signal has been generated.

2. A data communication network as claimed in claim 1, wherein said transmitting station further comprises a weighting element which comprises an output connected to said counter input and an input for receiving said generated messages, said weighting element comprising first means for subdividing on predetermined criteria said generated messages into at least two types of messages and for associating a dedicated adjustment signal with each type of message.

3. A data communication network as claimed in claim 2, wherein said subdivision into at least two types of messages to be transmitted is based on the functional importance of the message.

4. A data communication network as claimed in claim 2, wherein each message to be transmitted comprises a number of bits, said subdivision into at least two types of messages to be transmitted is based on the length according to the number of bits of the message.

5. A data communication network comprising at least one transmitting station and one receiving station, said transmitting station comprising:
    a control device for controlling the transmission of messages on the network, said control device being provided for generating an adjustment signal for each message generated by said transmitting station;
    an adjustable counter having a limited number of positions, said adjustable counter comprises a first counter input connected to said control device for receiving said adjustment signal, said adjustable counter being set to one of said positions under control of said adjustment signal, which set position indicates the integer number of copies of the same message to be transmitted, said adjustable counter having an output connected to said control device, said adjustable counter being provided for producing a series of indications which comprises at least a first and a second mutually exclusive indications;
    storage means for temporary storage of a message generated by the transmitting station, said storage means being connected to said control device;
    an encoder connceted with said storage means for providing an error recognition code to each generated message;
    adding means for adding under control of said control device and said adjustable counter said first indication to the first copy and said second indication to the last copy of said integer number of copies of the same message;
    said control device being further provided for transmitting consecutively each generated message together with its provided error recognition code as many times as indicated by said set position;
    said receiving station comprising:
    a decoder connected to said network for decoding received messages on the basis of their added error recognition code and for generating an acceptance signal if a received message has been correctly decoded;
    receiving means having a control input connected to said decoder for receiving said acceptance signal and a data input connected to said network for receiving messages transmitted thereon, said receiving means comprising recognition means for recognizing among said received messages said copies of a same message, said receiving means further comprising first fetching means for fetching among said recognized copies under control of said acceptance signal only a single copy for which said acceptance signal has been generated.

6. A data communication network as claimed in claim 5, wherein said series of indications is produced under control of said adjustment signal and comprises a number of elements formed by subsequent copy numbers, which number equals said integer number, said adding means further being provided for adding a respective copy number to each copy of said integer number of copies;
    said receiving means comprises second fetching means for fetching said copy number from a received message and for presenting said fetched copy number to said recognition means, said recognition means taking into account said copy number for the realization of said recognition.

7. A data communication network as claimed in claim 6, wherein said adding means is provided for adding said respective copy numbers in a decreasing order, the last copy of said integer number of copies bearing the lowest number; and said recognition is being provided for detecting said lowest number.

8. A data communication network, comprising at least two transmitting/receiving stations, each of which comprises a transmission unit and a receiving unit, said transmission unit comprising:
- a control device for controlling the transmission of messages on the network, said control device being provided for generating an adjustment signal for each message generated by said transmitting unit;
- said adjustable counter having a limited number of position, said adjustable counter comprises a first counter input connected to said control device for receiving said adjustment signal, said adjustable counter being settable to one of said positions under control of said adjustment signal, which set position indicates the integer number of copies of the same message to be transmitted, said adjustable counter having an output connected to said control device;
- storage means for temporary storage of a message generated by the transmitting unit, said storage means being connected by said control device;
- an encoder connected with each storage means for providing an error recognition code to each generated message;
- said control device being further provided for transmitting consecutively each generated message together with its provided error recognition code as many times as indicated by said set position;

said receiving unit comprising:
- a decoder connected to said network for decoding received messages on the basis of their added error recognition code and for generating an acceptance signal if a received message has been correctly decoded;
- receiving means having a control input connected to said decoder for receiving said acceptance signal and a data input connected to said network for receiving messages transmitted thereon, said receiving means comprises recognition means for recognizing among said received messages said copies of a same message, said receiving means further comprising first fetching means for fetching among said recognized copies under control of said acceptance signal only a single copy for which said acceptance signal has been generated;
- a network-quality counting element for determining a quality value which indicates the number of correct and/or incorrect copies of the same message received, an input of said counting element being connected to an output of said decoder.

9. A data communication network as claimed in claim 8, wherein said transmission unit comprises a weighting element having an output which is connected to an input of said adjustable counter and an input which is connected to an output of said network-quality counting element for the reception of said quality value, said weighting element being provided for determining, on the basis of said quality value, a network error rate for each message to be transmitted, and for deducting therefrom said adjustment signal.

10. A data communication network was claimed in claim 8 or 9, wherein said integer number of copies is smaller than or equal to ten.

* * * * *